US009785667B2

(12) United States Patent
Adiv et al.

(10) Patent No.: US 9,785,667 B2
(45) Date of Patent: *Oct. 10, 2017

(54) FAST CREATION OF A MASTER GFS2 FILE SYSTEM

(71) Applicant: INTERNATIONAL BUSINESS MACHINES CORPORATION, Armonk, NY (US)

(72) Inventors: Shachar Adiv, Tel Aviv (IL); Liran Loya, Hod-Hasharon (IL); Dan Melamed, Tel-Aviv (IL); Yossi Yamin, Gan Yavne (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/185,694

(22) Filed: Jun. 17, 2016

(65) Prior Publication Data

US 2016/0299940 A1  Oct. 13, 2016

Related U.S. Application Data

(63) Continuation of application No. 14/152,569, filed on Jan. 10, 2014, now Pat. No. 9,390,096.

(51) Int. Cl.
G06F 17/30 (2006.01)
(52) U.S. Cl.
CPC .. *G06F 17/30371* (2013.01); *G06F 17/30091* (2013.01)

(58) Field of Classification Search
CPC ............... G06F 17/30371; G06F 17/30091
See application file for complete search history.

(56) References Cited

U.S. PATENT DOCUMENTS

| 7,464,116 | B2 | 12/2008 | Sarma et al. |
| 7,480,682 | B1 | 1/2009 | Haslam et al. |
| 7,606,842 | B2 | 10/2009 | Quakenbush |
| 7,836,017 | B1 | 11/2010 | Srinivasan et al. |
| 7,996,414 | B2 | 8/2011 | Alpern et al. |
| 8,195,611 | B2 | 6/2012 | Adkins et al. |
| 8,453,145 | B1 | 5/2013 | Naik |
| 2008/0077634 | A1 | 3/2008 | Quakenbush |

OTHER PUBLICATIONS

Bosch et al., "Cut-and-Paste file-systems: integrating simulators and file-systems," USENIX 1996 Annual Technical conference, San Diego, CA, Jan. 1996 (20 pages).
Red Hat Enterprise Linux 6 Global File System 2, https://access.redhat.com/documentation/en-US/Red_Hat_Enterprise_Linux/6/html-single/Global_File_System_2/index.html, 2010, Red Hat Inc. (50 pages).

(Continued)

*Primary Examiner* — Jorge A Casanova
(74) *Attorney, Agent, or Firm* — Griffiths & Seaton PLLC

(57) ABSTRACT

For fast creation of a gfs2 file system, a master metadata image of a master file system is used for generating a small file systems identical in structure in the gfs2 file system containing a large sequential file. Metadata is captured of the master file system and stored as the master metadata image. A utility function of the gfs2 file system is used for saving the master metadata image of the master file system as a compressed binary file.

14 Claims, 4 Drawing Sheets

(56) References Cited

OTHER PUBLICATIONS

Mount Same Partition in Different Servers (Using Cluster), SecaServer, http://blog.secaservecom/tag/mount-disk-in-multiple-server/, Nov. 4, 2011 (10 pages).
Red Hat Enterprise, Red Hat Enterprise Linux 6 Global File System 2, https://www.rose-hulman.edu/Users/faculty/young/CS-Classes/emgt587/Resources/Interfaces-Red_Hat_Enterprise_Linux-6-Global_File_System_2-en-US.pdf (81 pages).
Marzinski et al., "GFS2: fallocate support," https://www.redhat.com/archives.cluster-devel/2010-August/msg00031.html, Aug. 23, 2010 (8 pages).

FAST CREATION OF A MASTER GFS2 FILE SYSTEM

CROSS-REFERENCE TO RELATED APPLICATIONS

This Application is a Continuation of U.S. patent application Ser. No. 14/152,569, filed on Jan. 10, 2014, the contents of which are incorporated herein by reference.

BACKGROUND OF THE INVENTION

Field of the Invention

The present invention relates in general to computers, and more particularly to fast creation of a master global file system 2 (gfs2) containing a large sequential file in a computing environment.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems involve storing and retrieving large amounts of data and metadata.

SUMMARY OF THE DESCRIBED EMBODIMENTS

In one embodiment, a method is provided for fast creation of a global file system 2 (gfs2) file system in a computing environment. In one embodiment, by way of example only, a master metadata image of a master file system is used for generating small file systems identical in structure in the gfs2 file system containing a large sequential file. Metadata is captured of the master file system and stored as the master metadata image. A utility function of the gfs2 file system is used for saving the master metadata image of the master file system as a compressed binary file.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
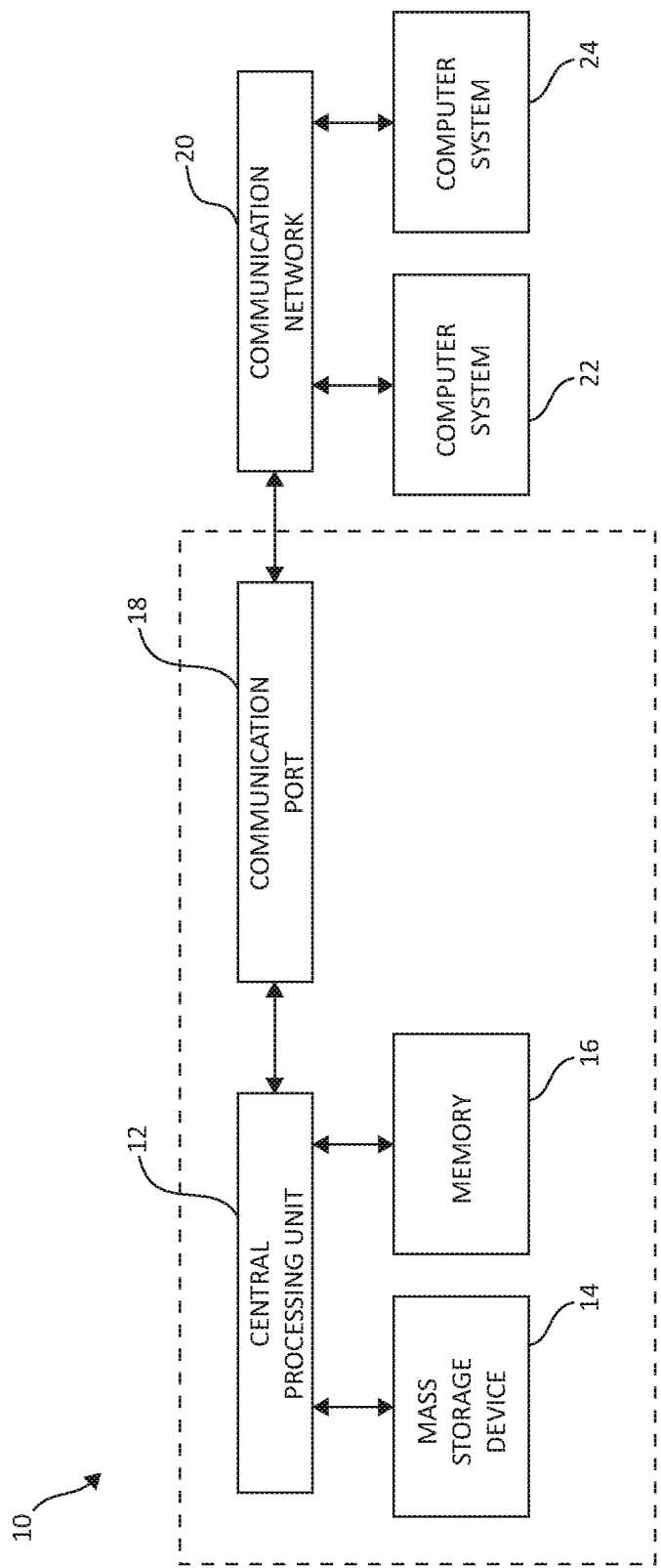
FIG. 1 is a block diagram illustrating a computing system environment having an example storage device in which aspects of the present invention may be realized.

As previously mentioned, with increasing demand for faster, more powerful and more efficient ways to store information, optimization of storage technologies is becoming a key challenge. In one embodiment, an application may use files to represent data structures, and having sequential files (on the file system) allows the application to provide better performance, both in sequential read and write access. This is assuming the containing file system has built its structures on the containing device in a sequential method. Another performance benefit for using files to represent data structures is achieved, in one embodiment, by pre-allocating all the storage a file requires, instead of having the file system allocate space, as the file grows, and requires more storage.

In one embodiment, the generation of such sequential, pre-allocated files may be done by system calls like fallocate that manipulate the file system's metadata in order to create such a file. The drawback of using fallocate is its poor performance, which has a growing negative impact as the amount of storage that needs to be configured grows. Thus, the present invention addresses this challenge by using master file system layout metadata to generate many small file systems, which are all identical in structure. In one embodiment, by way of example only, the template file system's metadata is used to generate all copied file systems thereby saving time compared to using fallocate to pre-allocate the sequential storage.

In one embodiment, by way of example only, the present invention first, creates (e.g., manually, dynamically, and/or automatically) one template file system using fallocate system call, and/or by writing zeroes to the template file system's files so that they are fully allocated and sequential. Second, the metadata of that file system is captured and stored as a master image. Third, using the captured master image, the rest of the file systems (e.g., any multiple file system copies) are created by dumping the metadata of the master file system.

It should be noted that on first time configurations the application is neutral regarding the data in the sequential file, and the only thing that matters is the file structure, and the data will be written later after the user started using the application. Taking the image of a file system metadata and restoring it to create multiple file systems allows the present invention to generate a complete file system without the need of writing any real data, only metadata.

In one embodiment, by way of example only, one master file system is created in a lab using fallocate system call. A global file system 2 (gfs2) file system is created. A padded file is created on the file system using fallocate, and/or by writing zeroes to it. The file system's structure is verified as required. The metadata of that file system is captured and stored as an image. A gfs2 edit utility function with the option 'savemeta' is used to create an image of the file system in the form of a compressed binary file. This captured image may then be added to the packaging procedure of a product/application. Using the captured image, the rest of the file systems are created using the meta-data of the master file system. In one embodiment, the metadata is restored on a customer machines using the image via the gfs2 edit tool function with the option 'restoremeta'. Each gfs2 file system stores the mount point in its metadata table. In one embodiment, different mount points are used for each file system so therefore the gfs2 metadata table is modified to reflect the different mount point. Thus, using the embodiments described herein, the present invention is able to create as many copies of the master file system as needed. The amount of writes to the storage device is 1% compared to the current state of the art.

Thus, the present invention provides for fully pre-allocated file systems that differ in content, and, a fully recoverable file system that is capable of maintaining it's user data, in situations where the file system's meta-data get corrupted. In one embodiment, the present invention is capable of implantation not only for server-attached storage, but also in a multi-node cluster environment and is not limited to a specific hardware implementation.

Turning now to FIG. 1, exemplary architecture 10 of data storage systems (e.g., virtual tape systems) in a computing environment is depicted. The computer system 10 includes central processing unit (CPU) 12, which is connected to mass storage device(s) 14 and memory device 16. Mass storage devices can include hard disk drive (HDD) devices, solid-state devices (SSD) etc., which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
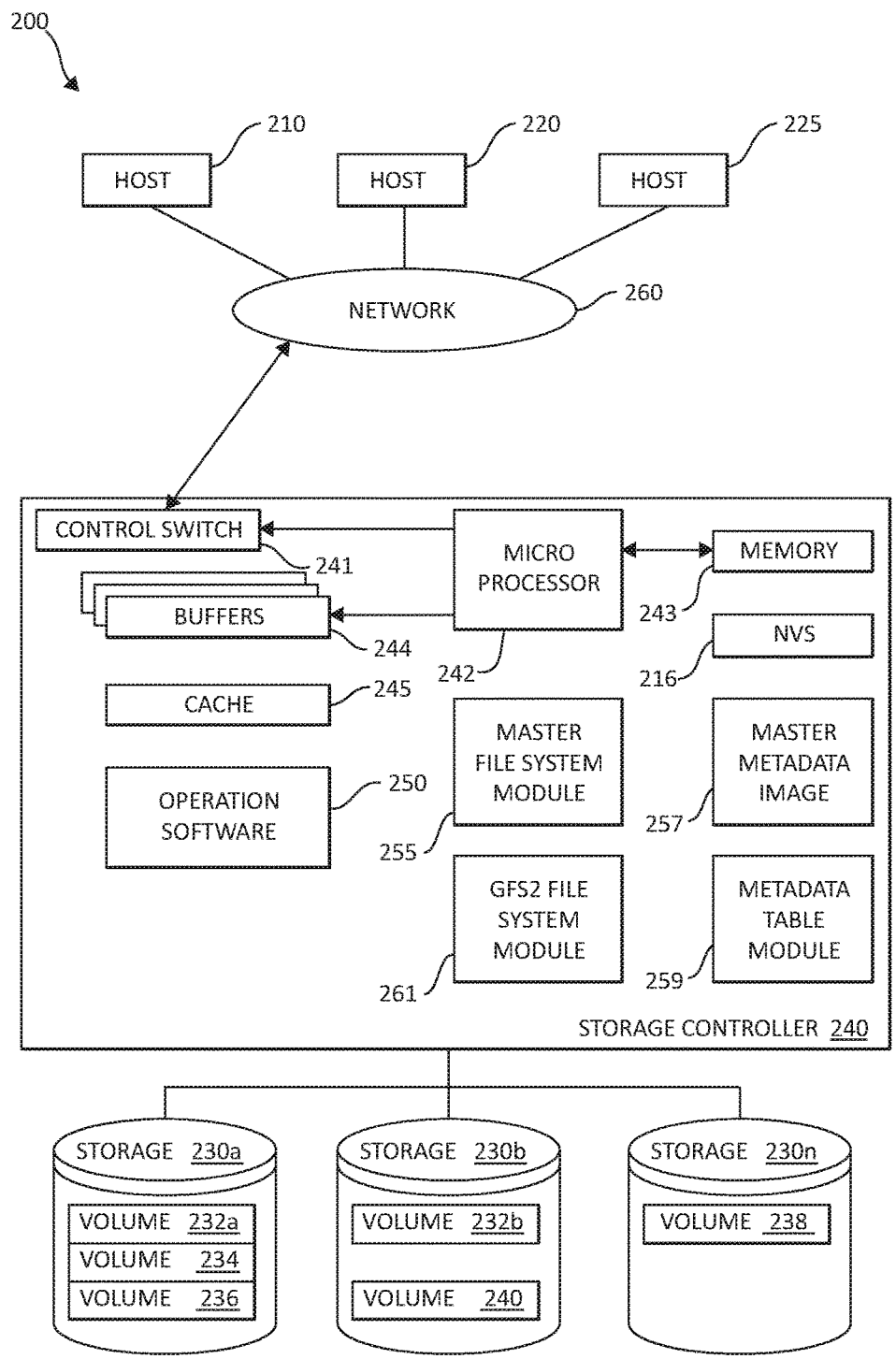
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Referring to FIG. 2, there are shown host computers 210, 220, 225, each acting as a central processing unit for performing data processing as a part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps associated with managing storage 230 and executing the steps and methods of the present invention in a computing environment. In one embodiment, system memory 243 includes, is associated, or is in communication with the operation software 250 for in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. It should be noted that although most storage operations are, in fact, write and read requests, there are other types of operations, such as an inquiry command. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the Cache 245 for any purposes suited to accomplish the objectives of the present invention. In some embodiments, a backup power source (not shown in FIG. 2), such a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a master file system 255, a master metadata image module 257, a metadata table 259, and a gfs2 file system module 261 in a computing environment. The master file system 255, the master metadata image module 257, the metadata table 259, and the gfs2 file system module 261 may work in conjunction with each and every component of the storage controller 240, the hosts 210, 220, 225, and storage devices 230. The master file system 255, the master metadata image module 257, the metadata table 259, and the gfs2 file system module 261 may be structurally one complete module or may be associated and/or included with other individual modules. The master file system 255, the master metadata image module 257, the metadata table 259, and the gfs2 file system module 261 may also be located in the cache 245 or other components of the storage controller 240 to accomplish the purposes of the present invention.

The storage controller 240 may be constructed with a control switch 241 for controlling the fibre channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, the master file system 255, the master metadata image module 257, the metadata table 259, and the gfs2 file system module 261 on which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network adaptor (this could be a fibre channel) 260 as an interface i.e., via at least one switch called "fabric." In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, the master file system 255, the master metadata image module 257, the metadata table 259, and the gfs2 file system module 261 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

Figure 3:
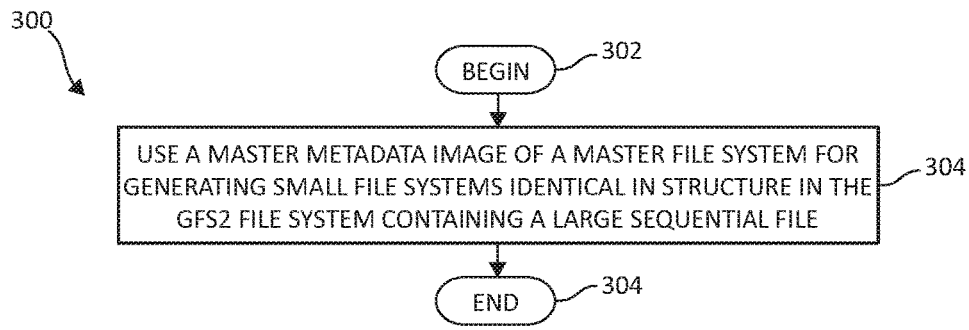
FIG. 3 is a flowchart illustrating an exemplary method for fast creation of a master gfs2 file system containing a large sequential file in which aspects of the present invention may be realized.

Turning now to FIG. 3, a flowchart illustrating an exemplary method 300 for a fast creation of a master gfs2 file system containing a large sequential file is depicted. The method 300 begins (step 302) by using a master metadata image of a master file system for generating small file systems identical in structure in the gfs2 file system containing a large sequential file (step 302). For example, on first time configurations an application is neutral regarding the data in a sequential file (e.g., a large sequential file) and the only thing that matters is the file structure, and the data will be written later after the user started using the application. By taking the image of a file system metadata and restoring it to create multiple file systems a complete file system is generated without the need of writing any real data, but rather, only metadata, which is a small portion of the file system (e.g., 1.2 GB out of 517 GB file system). Using the embodiments described herein, saves 99.8% of writing that would have been required if using only fallocate command to pre-allocate that file's storage, thus providing superior performance during the file system generation phase. It should be noted that the order of magnitude for the "small file systems" (e.g., small image) would be approximately 550 MB (megabytes). In one embodiment, the large file system is around 1 TiB (Tebibyte) (e.g., 1000 G "gigabyte") depending on the specific configuration. In other words, the file systems size, when fully deployed, is 1 TiB (1000 G), and the image that is kept to create the large file system is 550 MB. It should be noted, however, that the specific numbers represent a specific implementation, and they can certainly be used as examples to the general capability. Thus, depending on the specific implementation, the large size and the small size may be predefined and/or set according to desired values, a range of values, and/or according to implementation requirements. The method 300 then ends (step 304).

Figure 4:
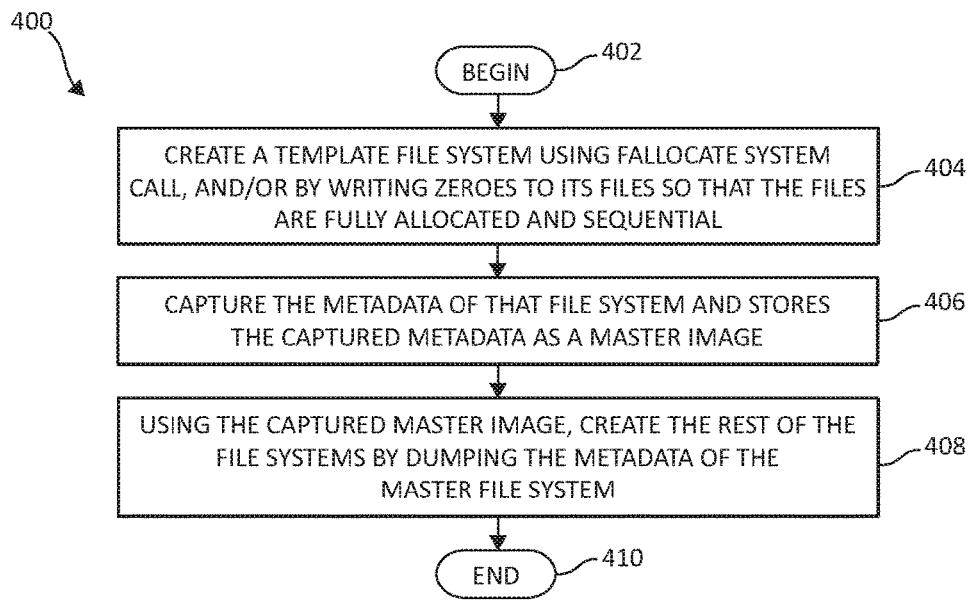
FIG. 4 is a flowchart illustrating an additional exemplary method for fast creation of a master gfs2 file system containing a large sequential file in which aspects of the present invention may be realized.

FIG. 4 a flowchart illustrating an exemplary additional method 400 for fast creation of a master gfs2 file system containing a large sequential file. The method 400 begins (step 402) by creating (manually) one template file system using fallocate system call, or by writing zeroes to its (e.g., the template file system) files, so that the files are fully allocated and sequential (step 404). The method 400 captures the metadata of that file system and stores the captured metadata as a master image (step 406). The method 400, using the captured master image, creates the rest of the file systems (e.g., the additional/multiple copies of the template file system) by dumping the metadata of the master file system (step 408). The method 400 ends (step 410).

Figure 5:
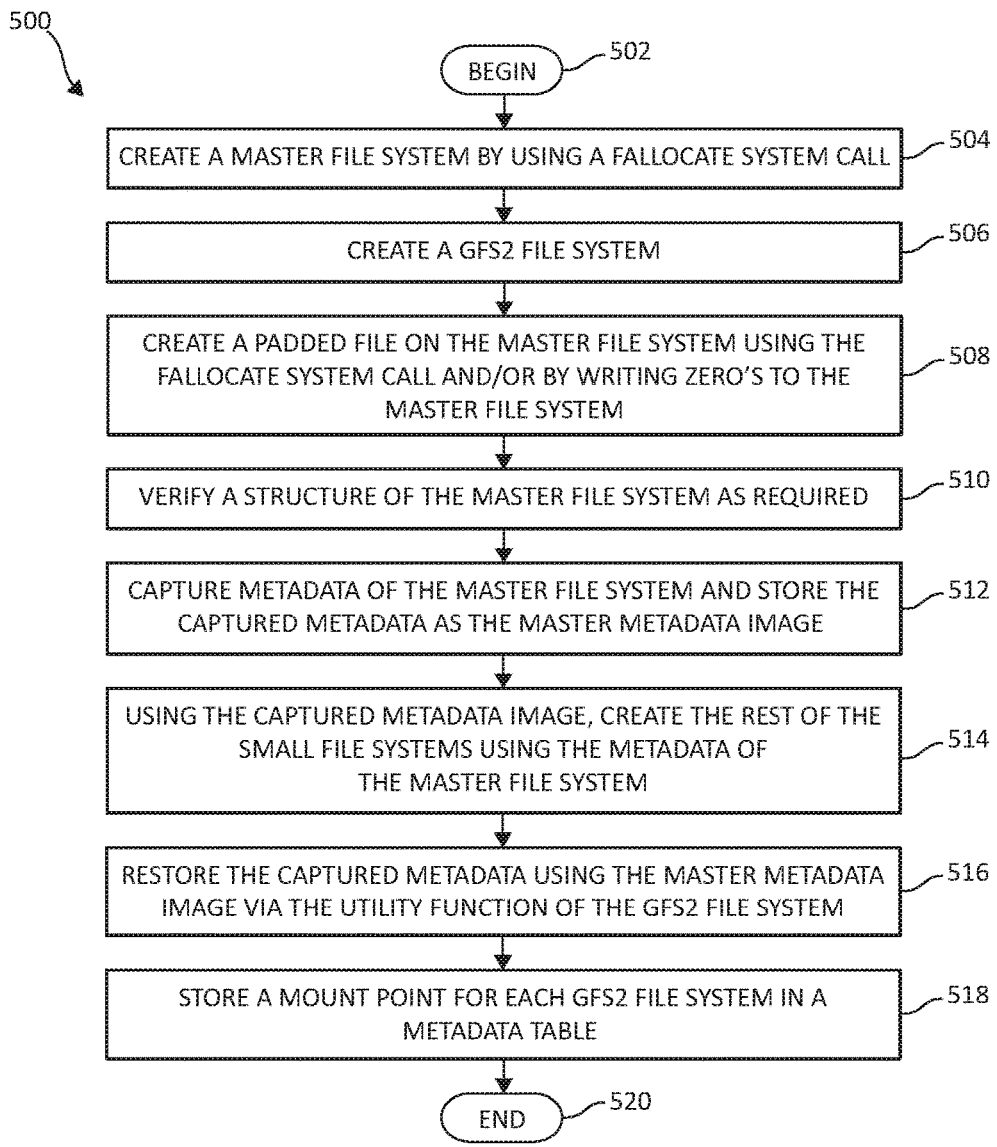
FIG. 5 is a flowchart illustrating an additional exemplary method for fast creation of a master gfs2 file system containing a large sequential file in which aspects of the present invention may be realized.

FIG. 5 a flowchart illustrating an exemplary additional method 500 for fast creation of a master gfs2 file system containing a large sequential file. The method 500 begins (step 502) by creating a master file system by using a fallocate system call (step 504). The method 500 creates the gfs2 file system (506). The method 500 creates a padded file on the master file system using the fallocate system call and/or by writing zeros to the master file system (step 508). The method 500 verifies a structure of the master file system as required (step 510). The method 500 captures metadata of the master file system and stores the captured metadata as the master metadata image (step 512). The method 500 uses a utility function of the gfs2 file system for saving the master metadata image of the master file system as a compressed binary file. The method 500 also adds the metadata image to packaging procedures of an application and/or product. Using the captured metadata image, the method 500 creates the rest of the small file systems using the metadata of the master file system (step 514). The method 500 restores the captured metadata using the master metadata image via the utility function of the gfs2 file system (e.g., on the customer machine, using the captured image, the method uses a gfs2 edit tool with the option 'restoremeta') (step 516). Each gfs2 file system stores a mount point for in a metadata table (step 518). Each of the gfs2 file systems use different mount points, so therefore, the metadata table is modified to reflect each of the different mount points. In one embodiment, the present invention uses the gfs2 tool with a superblock (sb), which is only a name of a parameter used in the command) option to modify the metadata table to the appropriate mount point and Red Hat cluster ID. The method 500 ends (step 520). After all steps are completed, the present invention is able to create as many copies of the master file system as needed/required. The amount of writes to the storage device is 1% compared to the current state of the art.

In one embodiment, the present invention provides for fast creation of a gfs2 file system in a computing environment. In one embodiment, by way of example only, a master metadata image of a master file system is used for generating small file systems identical in structure in the gfs2 file system containing a large sequential file. The master file system is manually created by using a fallocate system call and/or by writing zeros to the master file system. The master file system is fully allocated and sequential. The metadata of the master file system is captured, and stores the metadata as the master metadata image.

In one embodiment, the present invention uses the master metadata image for creating each of the small file systems by dumping the metadata of the master file system. In one embodiment, the present invention creates the master file system by using a fallocate system call. A gfs2 file system is created. A padded file is created on the master file system using the fallocate system call and/or by writing zeros to the master file system. A master file system's structure is verified as required.

In one embodiment, the metadata of the master file system is captured and stored as the master metadata image by using a utility function of the gfs2 file system for saving the master metadata image of the master file system as a compressed binary file.

In one embodiment, the present invention using the master metadata image for creating each of the small file systems using the metadata of the master file system, and/or restores the captured metadata using the master metadata image via the utility function of the gfs2 file system. In one embodiment, the present invention stores a mount point in each one of the gfs2 file systems in a metadata table, and/or uses different mount points for each of the plurality of gfs2 file systems, wherein the metadata table is modified to reflect each of the different mount points.

Thus, as described above, the present invention provides for a new paradigm for pre allocated file system creation and improves stability and performance. For example, while most application required pre-allocated file systems are padding file systems with zeros or using newly allocated syscall operation, the present invention is use a lightweight metadata image for the creating constant allocated FS. Thus, the present invention overcomes challenges of file system metadata by canceling the need for very slow and unpredictable file system (FS) full check (FSCK). In one embodiment, as described above, provides for faster file system creation, and the constant, predictable file allocation enables the option to map storage disk blocks to application layer data quickly for damage control in case of storage problem. Also, the present invention enables moving a file system creation to the storage side by pre-creating thin provision LUNs and make copies of the LUN. Also, ultra fast fandom data generation for tests may be executed by using the present invention described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a non-transitory computer readable medium, a non-transitory computer-readable media, a non-transitory computer readable signal medium, or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. It should be noted that a non-transitory computer-readable media and/or a non-transitory computer-readable medium include all computer-readable media and/or all computer-readable mediums with the sole exception being a transitory propagating signal per se.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for fast creation of a gfs2 file system using a processor device, the method comprising:
   using a master metadata image of a master file system for generating a plurality of small file systems identical in structure in the gfs2 file system containing a large sequential file;
   capturing metadata of the master file system and storing the captured metadata as the master metadata image;
   using a utility function of the gfs2 file system for saving the master metadata image of the master file system as a compressed binary file;
   creating the master file system by using a fallocate system call;
   creating the gfs2 file system;
   creating a padded file on the master file system using one of the fallocate system call and writing zeros to the master file system; and
   verifying a structure of the master file system as required.

2. The method of claim 1, further including manually creating the master file system by one of using a fallocate system call and writing zeros to the master file system, wherein the master file system is fully allocated and sequential.

3. The method of claim 2, further including capturing metadata of the master file system and storing the metadata as the master metadata image.

4. The method of claim 3, further including using the master metadata image for creating each of the plurality of small file systems by dumping the metadata of the master file system.

5. The method of claim 1, further including performing each one of:
   using the master metadata image for creating each of the plurality of small file systems using the metadata of the master file system, and
   restoring the captured metadata using the master metadata image via the utility function of the gfs2 file system.

6. The method of claim 5, further including performing one of:
   storing a mount point in each one of a plurality of gfs2 file systems in a metadata table, and
   using different mount points for each of the plurality of gfs2 file systems, wherein the metadata table is modified to reflect each of the different mount points.

7. A system for fast creation of a gfs2 file system of a computing system, the system comprising:
   at least one processor device in the computing system, wherein the at least one processor device:
   uses a master metadata image of a master file system for generating a plurality of small file systems identical in structure in the gfs2 file system containing a large sequential file,
   captures metadata of the master file system and storing the captured metadata as the master metadata image, uses a utility function of the gfs2 file system for saving the master metadata image of the master file system as a compressed binary file, creating the master file system by using a fallocate system call, creating the gfs2 file system, creating a padded file on the master file system using one of the fallocate system call and writing zeros to the master file system, and verifying a structure of the master file system as required.

8. The system of claim 7, wherein the at least one processor device manually creates the master file system by one of using a fallocate system call and writing zeros to the master file system, wherein the master file system is fully allocated and sequential.

9. The system of claim 8, wherein the at least one processor device captures metadata of the master file system and storing the metadata as the master metadata image.

10. The system of claim 9, wherein the at least one processor device uses the master metadata image for creating each of the plurality of small file systems by dumping the metadata of the master file system.

11. The system of claim 7, wherein the at least one processor device performs each one of each one of:

using the master metadata image for creating each of the plurality of small file systems using the metadata of the master file system, restoring the captured metadata using the master metadata image via the utility function of the gfs2 file system, storing a mount point in each one of a plurality of gfs2 file systems in a metadata table, and using different mount points for each of the plurality of gfs2 file systems, wherein the metadata table is modified to reflect each of the different mount points.

12. A computer program product for efficiently storing and retrieving data and metadata in a plurality of phases in a storage system using a processor device, the computer program product embodied on a non-transitory computer-readable storage medium having computer-readable program code portions stored therein, the computer-readable program code portions comprising:

an executable portion that uses a master metadata image of a master file system for generating a plurality of small file systems identical in structure in the gfs2 file system containing a large sequential file;

an executable portion that captures metadata of the master file system and storing the metadata as the master metadata image;

an executable portion that uses the master metadata image for creating each of the plurality of small file systems by dumping the metadata of the master file system;

an executable portion that creates the master file system by using a fallocate system call;

an executable portion that creates the gfs2 file system;

an executable portion that creates a padded file on the master file system using one of the fallocate system call and writing zeros to the master file system; and an executable portion that verifies a structure of the master file system as required.

13. The computer program product of claim 12, further including an executable portion that manually creates the master file system by one of using a fallocate system call and writing zeros to the master file system, wherein the master file system is fully allocated and sequential.

14. The computer program product of claim 12, further including an executable portion that performs each one of:

capturing metadata of the master file system and storing the captured metadata as the master metadata image, using a utility function of the gfs2 file system for saving the master metadata image of the master file system as a compressed binary file, using the master metadata image for creating each of the plurality of small file systems using the metadata of the master file system, restoring the captured metadata using the master metadata image via the utility function of the gfs2 file system, storing a mount point in each one of a plurality of gfs2 file systems in a metadata table, and using different mount points for each of the plurality of gfs2 file systems, wherein the metadata table is modified to reflect each of the different mount points.

* * * * *